US012583320B2

(12) United States Patent
Lee

(10) Patent No.: US 12,583,320 B2
(45) Date of Patent: Mar. 24, 2026

(54) VEHICLE CONTROL APPARATUS AND METHOD THEREOF

(71) Applicants: HYUNDAI MOTOR COMPANY, Seoul (KR); Kia Corporation, Seoul (KR)

(72) Inventor: Tae Ho Lee, Seoul (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 244 days.

(21) Appl. No.: 18/243,822

(22) Filed: Sep. 8, 2023

(65) Prior Publication Data

US 2024/0181877 A1     Jun. 6, 2024

(30) Foreign Application Priority Data

Dec. 5, 2022     (KR) ........................ 10-2022-0167962

(51) Int. Cl.
*B60K 35/28*          (2024.01)
*G08G 1/0967*         (2006.01)

(52) U.S. Cl.
CPC ....... *B60K 35/28* (2024.01); *G08G 1/096775* (2013.01); *G08G 1/096783* (2013.01); *B60K 2360/164* (2024.01)

(58) Field of Classification Search
CPC .. B60K 35/00; B60K 35/28; B60K 2360/164; G08G 1/096775; G08G 1/096783
USPC ........................................................ 701/36
See application file for complete search history.

(56) References Cited

U.S. PATENT DOCUMENTS

| | | | | |
|---|---|---|---|---|
| 7,167,106 | B2* | 1/2007 | Haase ............. | G08G 1/096716 |
| | | | | 340/905 |
| 7,538,689 | B2* | 5/2009 | Haase ............. | G08G 1/096716 |
| | | | | 340/905 |
| 8,675,909 | B2* | 3/2014 | Sivertsen ................. | G08G 1/07 |
| | | | | 340/905 |
| 9,064,409 | B1* | 6/2015 | Sivertsen ............... | G08G 1/096 |
| 9,153,128 | B2* | 10/2015 | Holzwanger ......... | G08G 1/0967 |
| 9,633,560 | B1* | 4/2017 | Gao ......................... | G08G 1/07 |
| 10,933,861 | B2* | 3/2021 | Kim ..................... | B60W 30/182 |
| 10,991,242 | B2* | 4/2021 | Taylor ...................... | H04Q 9/00 |
| 11,731,618 | B2* | 8/2023 | Penilla ................. | G08G 1/0112 |
| | | | | 701/41 |
| 12,277,779 | B2* | 4/2025 | Asghar .............. | A61B 5/02055 |
| 2005/0187701 | A1* | 8/2005 | Baney .............. | G08G 1/096716 |
| | | | | 340/907 |
| 2005/0231385 | A1* | 10/2005 | Haase ................ | G06Q 30/0267 |
| | | | | 705/14.62 |

(Continued)

*Primary Examiner* — Luis A Martinez Borrero
(74) *Attorney, Agent, or Firm* — MORGAN, LEWIS & BOCKIUS LLP

(57)     ABSTRACT

A vehicle control apparatus includes a sensor device that obtains position information and driving information of a vehicle, a communication device that receives traffic light information related to at least one traffic light associated with the position information from the outside thereof, and a controller configured for determining whether to provide a service prohibited for use while the vehicle is traveling, depending on a remaining time until a signal for allowing the vehicle to drive is turned on, which is determined based on at least one of the position information, the driving information, the traffic light information, or a combination thereof.

20 Claims, 6 Drawing Sheets

(56) References Cited

U.S. PATENT DOCUMENTS

| | | | | |
|---|---|---|---|---|
| 2007/0118395 | A1* | 5/2007 | Haase | G08G 1/095 |
| | | | | 705/1.1 |
| 2011/0254701 | A1* | 10/2011 | Yamada | G08G 1/095 |
| | | | | 340/905 |
| 2015/0243165 | A1* | 8/2015 | Elsheemy | G08G 1/096775 |
| | | | | 340/906 |
| 2017/0032670 | A1* | 2/2017 | Poornachandran | |
| | | | | G08G 1/096783 |
| 2017/0197617 | A1* | 7/2017 | Penilla | G08G 1/0129 |
| 2017/0200197 | A1* | 7/2017 | Brubaker | B60Q 1/2619 |
| 2018/0158329 | A1* | 6/2018 | Benhammou | G08G 1/07 |
| 2019/0035268 | A1* | 1/2019 | Madigan | G08G 1/095 |
| 2019/0184976 | A1* | 6/2019 | Kim | B60W 20/20 |
| 2019/0206236 | A1* | 7/2019 | Tao | G08G 1/08 |
| 2020/0005632 | A1* | 1/2020 | Chen | G08G 1/096775 |
| 2020/0126406 | A1* | 4/2020 | Ma | G08G 1/0112 |
| 2020/0201353 | A1* | 6/2020 | Martin | G08G 1/096844 |
| 2020/0242922 | A1* | 7/2020 | Dulberg | G08G 1/166 |
| 2021/0053566 | A1* | 2/2021 | Kobayashi | B60W 40/04 |
| 2021/0348932 | A1* | 11/2021 | Friedman | G01C 21/3655 |
| 2022/0126864 | A1* | 4/2022 | Moustafa | B60W 60/0013 |
| 2022/0159432 | A1* | 5/2022 | Crawford | H04W 4/48 |
| 2022/0415170 | A1* | 12/2022 | Frank | G08G 1/081 |
| 2023/0012196 | A1* | 1/2023 | Abundis Vargas | |
| | | | | G08G 1/096716 |
| 2023/0106673 | A1* | 4/2023 | Asghar | G06V 20/584 |
| | | | | 382/104 |
| 2023/0154325 | A1* | 5/2023 | Kamakura | G08G 1/096716 |
| | | | | 340/905 |
| 2024/0096212 | A1* | 3/2024 | Khosla | H04W 40/20 |
| 2025/0209834 | A1* | 6/2025 | Asghar | A61B 5/318 |

* cited by examiner

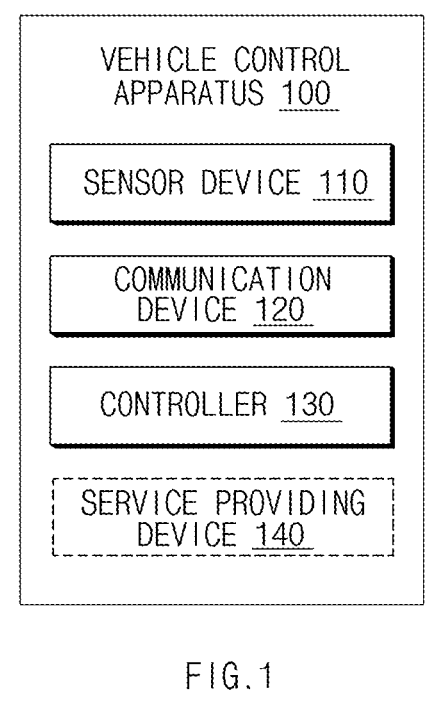

VEHICLE CONTROL
APPARATUS 100

SENSOR DEVICE 110

COMMUNICATION
DEVICE 120

CONTROLLER 130

SERVICE PROVIDING
DEVICE 140

FIG.1

VEHICLE CONTROL APPARATUS AND METHOD THEREOF

CROSS-REFERENCE TO RELATED APPLICATION

The present application claims priority to Korean Patent Application No. 10-2022-0167962, filed on Dec. 5, 2022, the entire contents of which is incorporated herein for all purposes by this reference.

BACKGROUND OF THE PRESENT DISCLOSURE

Field of the Present Disclosure

The present disclosure relates to a vehicle control apparatus and a method thereof, and more particularly, relates to technologies of determining whether to provide a user with at least one service, using information related to an environment around a vehicle (e.g., a position of the vehicle, a driving state of the vehicle, or a traffic light state).

Description of Related Art

As there has been an increase in time when persons stay in a vehicle, a technology about the driving of the vehicle has been gradually improved and various technologies for controlling the driving of the vehicle have been developed.

For example, a vehicle control apparatus may provide a user with various services (e.g., image display) by an infotainment system provided in the vehicle. The infotainment system may include at least one display device provided in the vehicle and may be electrically connected to an external device (e.g., a user terminal) associated with the user to provide various services matched with needs of the user.

Meanwhile, whether to operate the above-mentioned infotainment system should be able to be changed, based on a driving state of the vehicle. For example, when it is determined that the vehicle is traveling, at least a portion of a service provided by the infotainment system should be able to stop being provided to the user from being distracted. For another example, when it is determined that the vehicle is stopping, it may be preferable to operate the infotainment system to provide the user with a convenience function and/or an entertainment function.

A vehicle control apparatus according to a conventional technology may be configured to determine whether to provide a service, based on whether the vehicle is traveling. For example, when it is identified that the vehicle is traveling, based on monitoring a driving state of the vehicle in real time or receiving information related to a state of the vehicle from the user, driving regulation determination logic may be used to stop providing the service by the infotainment system.

However, a method according to the conventional technology utilizes the driving regulation determination logic based on limited data. For example, because information related to an environment around the vehicle (e.g., a state where a traffic light adjacent to the vehicle is turned on) is not reflected to determine whether to provide the service by the driving regulation determination logic, there may be a limitation in a process of adaptively performing an operation of determining whether to provide the service in various driving environments.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus for determining whether to provide a service prohibited for use while a vehicle is traveling, based on at least one of position information of the vehicle, driving information of the vehicle, traffic light information, or a combination thereof and a method thereof.

Another aspect of the present disclosure provides a vehicle control apparatus for determining a traffic light which turns on a signal for allowing a vehicle to drive among traffic lights using driving information including at least one of a driving route of the vehicle, a driving direction of the vehicle, a driving line of the vehicle, or a combination thereof and a method thereof.

Another aspect of the present disclosure provides a vehicle control apparatus for adaptively changing a reference time using at least one of whether there are other vehicles, the number of the other vehicles, traffic volume near to the vehicle, or a combination thereof and comparing the changed reference time with a remaining time to determine whether to provide a service and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include a sensor device that obtains position information and driving information of a vehicle, a communication device that receives traffic light information related to at least one traffic light associated with the position information from the outside thereof, and a controller configured for determining whether to provide a service prohibited for use while the vehicle is traveling, depending on a remaining time until a signal for allowing the vehicle to drive is turned on, the remaining time being determined based on at least one of the position information, the driving information, the traffic light information, or a combination thereof.

According to an exemplary embodiment of the present disclosure, the driving information may include at least one of a driving route of the vehicle, a driving direction of the vehicle, a driving line of the vehicle, or a combination thereof. For example, the controller may be configured to determine a traffic light which turns on the signal for allowing the vehicle to drive among the at least one traffic light, based on at least one of the position information, the driving information, the driving direction, the driving line, the traffic light information, or a combination thereof.

According to an exemplary embodiment of the present disclosure, the traffic light information may include at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

According to an exemplary embodiment of the present disclosure, the controller may prohibit the service from being provided, when the controller concludes that the remaining time is less than or equal to a predetermined reference time.

According to an exemplary embodiment of the present disclosure, the reference time may be set based on at least one of whether there are other vehicles which are present between the vehicle and a traffic light which turns on the signal for allowing the vehicle to drive, the number of the other vehicles, traffic volume associated with driving of the vehicle, or a combination thereof or may be directly set in response to a user's input of the vehicle.

According to an exemplary embodiment of the present disclosure, a reference time in which there are no other vehicles may be set to a value greater than a reference time in which there are the other vehicles.

According to an exemplary embodiment of the present disclosure, the reference time may include a negative correlation with the number of the other vehicles.

According to an exemplary embodiment of the present disclosure, the reference time may include a positive correlation with a degree to which the traffic volume increases.

According to an exemplary embodiment of the present disclosure, the controller is configured to adjust the reference time to a value less than a predetermined value, when there is no another vehicle between the vehicle and a traffic light which turns on the signal for allowing the vehicle to drive and when traffic volume associated with driving of the vehicle is low according to a specific criterion, and may prohibit the service from being provided, when the remaining time is less than or equal to the value less than the predetermined value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a block diagram illustrating components of a vehicle control apparatus according to an exemplary embodiment of the present disclosure;

Figure 2:
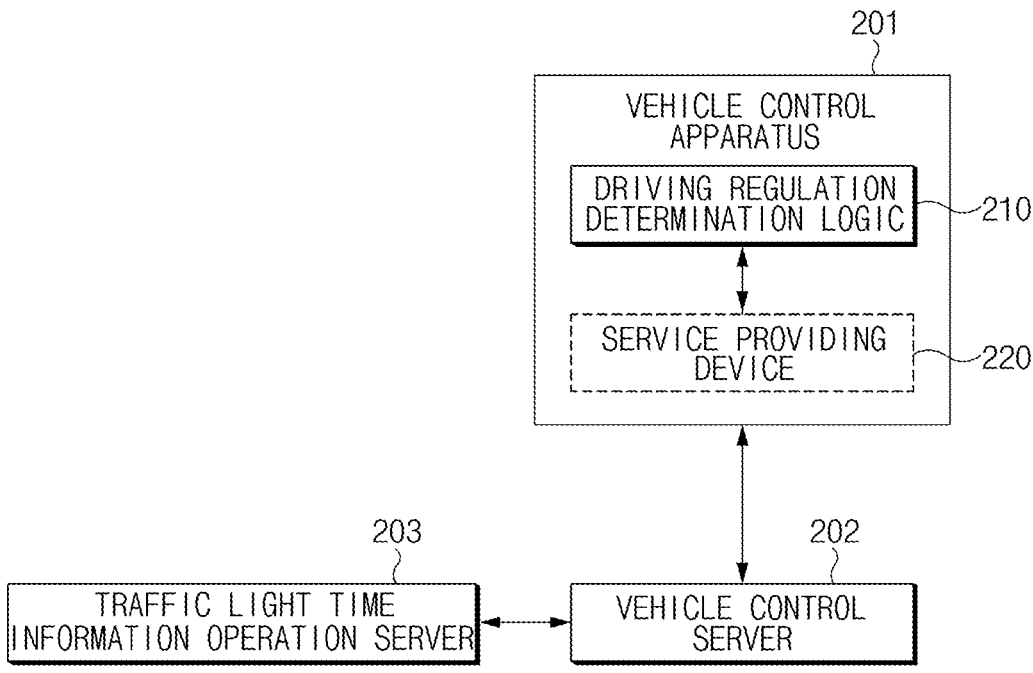
FIG. 2 is a block diagram illustrating a system including a vehicle control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 6.

FIG. 1 is a block diagram illustrating components of a vehicle control apparatus according to an exemplary embodiment of the present disclosure.

According to an exemplary embodiment of the present disclosure, a vehicle control apparatus 100 may include at least one of a sensor device 110, a communication device 120, a controller 130, a service providing device 140, or a combination thereof. The components of the vehicle control apparatus 100, which are shown in FIG. 1, are illustrative, and embodiments of the present disclosure are not limited thereto. For example, the vehicle control apparatus 100 may further include components (e.g., at least one of an interface, a memory, a display, or a combination thereof) which are not shown in FIG. 1.

According to an exemplary embodiment of the present disclosure, the sensor device 110 may obtain various pieces of information related to a vehicle.

For example, the sensor device 110 may obtain position information and/or driving information of the vehicle.

As an exemplary embodiment of the present disclosure, the position information of the vehicle may include a current position of the vehicle. The sensor device 110 may obtain the position information including the current position of the vehicle using, for example, a global positioning system (GPS) or the like.

As an exemplary embodiment of the present disclosure, the driving information of the vehicle may include at least one of a driving route of the vehicle, a driving direction of the vehicle, a driving line of the vehicle, or a combination thereof. The sensor device 110 may obtain various pieces of information associated with driving of the vehicle in real time using, for example, at least one sensor. Table 1 below may include illustrative contents about the driving information of the vehicle.

TABLE 1

| Item | Details |
|---|---|
| Position | Address; Yeongdeungpo-gu, Seoul/latitude: 37.XX/longitude: 126.XX |
| Driving direction | Left turn |
| Lane | First lane |

According to an exemplary embodiment of the present disclosure, the communication device 120 may establish a communication channel (e.g., a wireless communication channel) between the vehicle control apparatus 100 and an external device (e.g., a vehicle control server 202 of FIG. 2) and may assist in communicating over the established communication channel. For example, the communication device 120 may include one or more communication processors which operate independently of the controller 130 (e.g., an application processor) and support direct (e.g., wired) communication or wireless communication.

For example, the communication device 120 may include a wireless communication module (e.g., a cellular communication module, a short range wireless communication module, or a global navigation satellite system (GNSS) communication module) and/or a wired communication module (e.g., a local area network (LAN) communication module or a power line communication module). The corresponding communication module among such communication modules may communicate with the external device over a first network (e.g., a short range communication network such as Bluetooth, wireless-fidelity (Wi-Fi) Direct, or infrared data association (IrDA)) or a second network (e.g., a long range communication network such as a legacy cellular network, a fifth generation (5G) network, a next-generation communication network, the Internet, or a computer network (e.g., a local area network (LAN) or a wide area network (WAN))). Such several types of communication modules may be integrated into one component (e.g., a single chip) or may be implemented as a plurality of components (e.g., a plurality of chips) independent of each other. Furthermore, the communication device 120 may be implemented as a single chip together with the controller 130.

For example, the communication device 120 may transmit and receive various pieces of data based on communication with the external device.

As an exemplary embodiment of the present disclosure, the communication device 120 may receive traffic light information related to at least one traffic light associated with the position information of the vehicle from the outside thereof (or the external device). At least one traffic light may include, for example, a traffic light identified as being located at a place adjacent to the vehicle based on the position information of the vehicle.

As an exemplary embodiment of the present disclosure, the traffic light information may include at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof. Table 2 below may include illustrative contents about the traffic light information.

TABLE 2

| Item | Details |
|---|---|
| ID(traffic light identifier) | 0X000525 |
| Position (traffic light address, latitude, longitude) | Address; Yeongdeungpo-gu, Seoul/latitude: 37.XX/longitude: 126.XX |
| Direction (traffic light control direction) | Gangbuk direction |

According to an exemplary embodiment of the present disclosure, the controller 130 may be operatively connected to the sensor device 110, the communication device 120, and/or the service providing device 140. For example, the controller 130 may be configured for controlling operations of the sensor device 110, the communication device 120, and/or the service providing device 140.

For example, the controller 130 may be configured to determine whether to provide a service prohibited from use while the vehicle is traveling, using at least a part of information which is obtained and/or received using at least one of the sensor device 110, the communication device 120, or a combination thereof.

As an exemplary embodiment of the present disclosure, the controller 130 may be configured to determine whether to provide a service prohibited for use while the vehicle is traveling, depending on a remaining time until a signal for allowing the vehicle to drive is turned on, which is determined based on at least one of the position information of the vehicle, the driving information of the vehicle, the traffic light information, or a combination thereof.

As an exemplary embodiment of the present disclosure, the controller 130 may be configured to determine a traffic light which turns on a signal for allowing the vehicle to drive among the at least one traffic light, based on at least one of the position information of the vehicle, the traffic light information, or a driving route of the vehicle, a driving direction of the vehicle, or a driving line of the vehicle, which is included in the driving information, or a combination thereof.

As an exemplary embodiment of the present disclosure, when the vehicle waits for making a left turn, the controller 130 may be configured to determine a traffic light which turns on a signal for allowing the vehicle to make a left turn based on at least some of the above-mentioned pieces of information.

For example, when the remaining time is less than or equal to a predetermined reference time, the controller 130 may prohibit the service from being provided.

As an exemplary embodiment of the present disclosure, the reference time may be set based on at least one of whether there are other vehicles which are present between the vehicle and the traffic light which turns on the signal for allowing the vehicle to drive, the number of the other vehicles, traffic volume associated with driving of the vehicle, or a combination thereof.

As an exemplary embodiment of the present disclosure, a reference time in which there are no other vehicles may be set to a value greater than a reference time in which there are the other vehicles.

As an exemplary embodiment of the present disclosure, the reference time may include a negative correlation with the number of the other vehicles. In other words, as the number of the other vehicles increases, the reference time may be set to a smaller value.

As an exemplary embodiment of the present disclosure, the reference time may include a positive correlation with a degree to which traffic volume increases. In other words, as the traffic volume increases, the reference time may be set to a larger value.

As an exemplary embodiment of the present disclosure, the reference time may be a setting value capable of being directly set in response to a user's input of the vehicle.

For example, the controller 130 may adjust the reference time based on traffic volume associated with driving of another vehicle which is present in an area adjacent to the vehicle and/or driving of the vehicle.

As an exemplary embodiment of the present disclosure, when there is no another vehicle between the vehicle and the traffic light which turns on the signal for allowing the vehicle to drive and when traffic volume associated with the driving of the vehicle is low according to a specific criterion, the controller 130 may adjust the reference time to a value less than a predetermined value.

When the remaining time is less than or equal to the value less than the predetermined value, the controller 130 may prohibit the service from being provided.

According to an exemplary embodiment of the present disclosure, the service providing device 140 may include at least one output device. For example, the service providing device 140 may include an output device (e.g., a display and/or a speaker) provided in at least a portion of the vehicle.

For example, the service providing device 140 may visually and/or audibly provide the user with various pieces of content (e.g., at least one of image display, navigation information, an entertainment function, or a combination thereof).

For example, the service providing device 140 may stop providing the service under control of the controller 130. As an exemplary embodiment of the present disclosure, the service providing device 140 may identify and store information where content is performed at a time point when the service is stopped by the control of the controller 130 (e.g., at least one of a service provided up to the time point when the service is stopped, a service to be provided after the time point when the service is stopped, a service which is being provided at the time point when the service is stopped, or a combination thereof).

FIG. 2 is a block diagram illustrating a system including a vehicle control apparatus according to an exemplary embodiment of the present disclosure.

According to an exemplary embodiment of the present disclosure, a vehicle control system may include at least one of a vehicle control apparatus 201 (e.g., a vehicle control apparatus 100 of FIG. 1), a vehicle control server 202, a traffic light time information operation server 203, or a combination thereof.

According to an exemplary embodiment of the present disclosure, the vehicle control apparatus 201 may perform communication with the vehicle control server 202. For example, the vehicle control apparatus 201 may transmit and receive various pieces of data based on the communication with the vehicle control server 202. For example, in an exemplary embodiment of the present disclosure, the vehicle control apparatus 201 may be defined as a "vehicle".

According to an exemplary embodiment of the present disclosure, the vehicle control server 202 may perform communication with the vehicle control apparatus 201 and/or the traffic light time information operation server 203. For example, the vehicle control server 202 may transmit and receive various pieces of data based on the communication with the vehicle control apparatus 201 and/or the traffic light time information operation server 203.

According to an exemplary embodiment of the present disclosure, the traffic light time information operation server 203 may perform communication with the vehicle control server 202. For example, the traffic light time information operation server 203 may transmit and receive various pieces of data based on the communication with the vehicle control server 202.

According to an exemplary embodiment of the present disclosure, the vehicle control apparatus 201 may include driving regulation determination logic 210 and a service providing device 220. The vehicle control apparatus 201 may be configured to determine whether to provide a service by the service providing device 220, based on the result performed by the driving regulation determination logic 210.

For example, the vehicle control apparatus 201 may deliver at least one of position information of the vehicle, driving information of the vehicle, or a combination thereof to the outside (e.g., the vehicle control server 202) and may receive a remaining time until a signal for allowing the vehicle to drive is turned on from the outside.

As an exemplary embodiment of the present disclosure, the driving information may include at least one of a driving route of the vehicle, a driving direction of the vehicle, a driving line of the vehicle, or a combination thereof.

For example, the vehicle control apparatus 201 may compare the remaining time with a predetermined reference time to determine whether to provide a service prohibited for use while the vehicle is traveling.

For example, when the remaining time is less than or equal to the predetermined reference time, the vehicle control apparatus 201 may prohibit the service from being provided.

For example, the vehicle control apparatus 201 may set the reference time based on at least one of whether there are other vehicles which are present between the vehicle and a traffic light which turns on the signal for allowing the vehicle to drive, the number of the other vehicles, traffic volume associated with driving of the vehicle, or a combination thereof or may set the reference time in response to an input of a user of the vehicle. As an exemplary embodiment of the present disclosure, the input of the user of the vehicle may be a touch input to a display included in the vehicle control apparatus 201. As an exemplary embodiment of the present disclosure, the input of the user of the vehicle may be an input received from an external device (e.g., a user terminal) corresponding to the user.

For example, the vehicle control apparatus 201 may set a reference time in which there are no other vehicles to a value greater than a reference time in which there are the other vehicles, may set the reference time to include a negative correlation with the number of the other vehicles, or may set the reference time to include a positive correlation with a degree to which traffic volume increases.

For example, when there is no another vehicle between the vehicle and the traffic light which turns on the signal for allowing the vehicle to drive and when traffic volume associated with the driving of the vehicle is low according to a specific criterion, the control 201 may adjust the reference time to a value less than a predetermined value. When the remaining time is less than or equal to the value less than the predetermined value, the vehicle control apparatus 201 may prohibit the service from being provided.

According to an exemplary embodiment of the present disclosure, the vehicle control server 202 may have traffic light information related to at least one traffic light and may be configured to determine a remaining time about whether to provide a service of the vehicle control apparatus 201.

For example, the vehicle control server 202 may receive traffic light information related to at least one traffic light from the traffic light time information operation server 203 and may store the received traffic light information in its memory.

As an exemplary embodiment of the present disclosure, the traffic light information may include at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

For example, the vehicle control server 202 may be configured to determine a remaining time based on at least one of the position information, the driving information, the traffic light information, or a combination thereof. As an exemplary embodiment of the present disclosure, the vehicle control server 202 may transmit the determined remaining time to the vehicle control apparatus 201.

For example, the vehicle control server 202 may be configured to determine a traffic light which turns on a signal for allowing the vehicle to drive among the at least one traffic light, based on at least one of the position information, the driving route, the driving direction, the driving line, the traffic light information, or a combination thereof.

According to an exemplary embodiment of the present disclosure, the traffic light time information operation server 203 may monitor traffic light information related to at least one traffic light.

For example, the traffic light time information operation server 203 may identify a signal display remaining time state included in each of the at least one traffic light and may transmit the identified result to the vehicle control server 202.

For example, the traffic light time information operation server 203 may be implemented as one server together with the vehicle control server 202. In other words, the vehicle control server 202 may monitor information related to at least one traffic light using the traffic light time information operation server 203 and may store the monitored result in the memory.

As an exemplary embodiment of the present disclosure, the traffic light information may include at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

Figure 3:
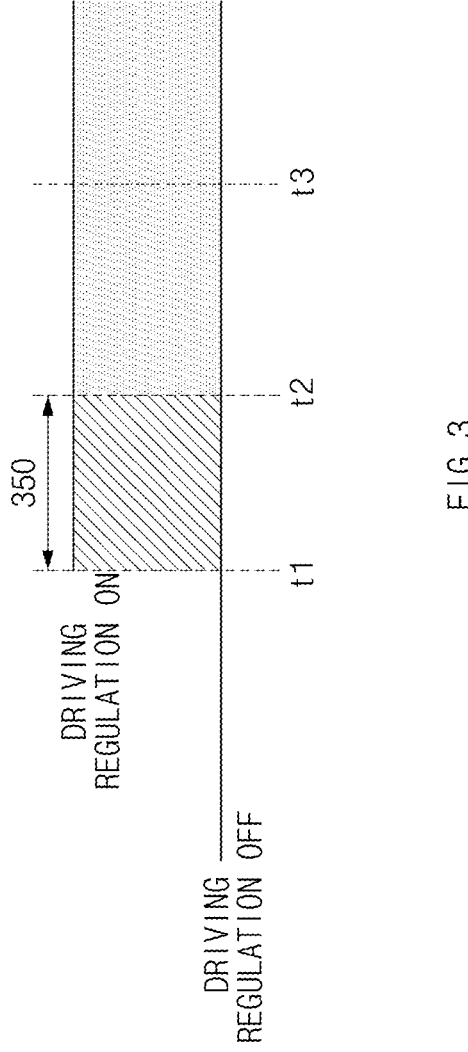
FIG. 3 is an operational conceptual diagram of a vehicle control apparatus according to an exemplary embodiment of the present disclosure.

FIG. 3 is an operational conceptual diagram of a vehicle control apparatus according to an exemplary embodiment of the present disclosure.

According to an exemplary embodiment of the present disclosure, a vehicle control apparatus (e.g., a vehicle control apparatus 100 of FIG. 1) may be configured to determine whether to turn on and/or off driving regulation based on driving regulation determination logic (e.g., driving regulation determination logic 210 of FIG. 2).

For example, the driving regulation ON operation may include an operation of prohibiting a service, which is prohibited for use while a vehicle is traveling, from being provided among various services capable of being provided by a service providing device (e.g., a service providing device 220 of FIG. 2).

For example, the driving regulation ON operation may be performed further based on a gear state and/or a driving speed of the vehicle.

As an exemplary embodiment of the present disclosure, when the gear state of the vehicle corresponds to a specified state (e.g., a state where it is not the P stage), the vehicle control apparatus may perform the driving regulation ON operation.

As an exemplary embodiment of the present disclosure, although the gear state of the vehicle is not the specified state, when the driving speed of the vehicle is greater than a specified speed (e.g., 5 km/h), the vehicle control apparatus may perform the driving regulation ON operation.

For example, the driving regulation OFF operation may include an operation of allowing various services, including a service prohibited for use while the vehicle is traveling among the various services capable of being provided by the service providing device, to be provided.

According to an exemplary embodiment of the present disclosure, a first time t1 may be a start time point when the vehicle control apparatus according to an exemplary embodiment of the present disclosure performs the driving regulation ON operation.

According to an exemplary embodiment of the present disclosure, a second time t2 may be a time point when a signal for allowing the vehicle to drive is turned on.

According to an exemplary embodiment of the present disclosure, a third time t3 may be a start time point when a vehicle control apparatus according to a conventional technology performs the driving regulation ON operation.

According to an exemplary embodiment of the present disclosure, the vehicle control apparatus according to an exemplary embodiment of the present disclosure may perform the driving regulation ON operation at a faster time point than the vehicle control apparatus according to the conventional technology, thus stopping and/or prohibiting the service prohibited for use while the vehicle is traveling from being provided and providing the user with a preparation time 350 for driving of the vehicle.

For example, the preparation time 350 may be defined as a reference time (e.g., 5 seconds) from a time point when a signal for allowing the vehicle to drive is turned on.

For example, when the remaining time until the signal for allowing the vehicle to drive is turned on is less than or equal to the preparation time 350 (or the reference time), the vehicle control apparatus may perform the driving regulation ON operation.

Thus, the user may experience a vehicle control function having more stable and high usability.

Figure 4:
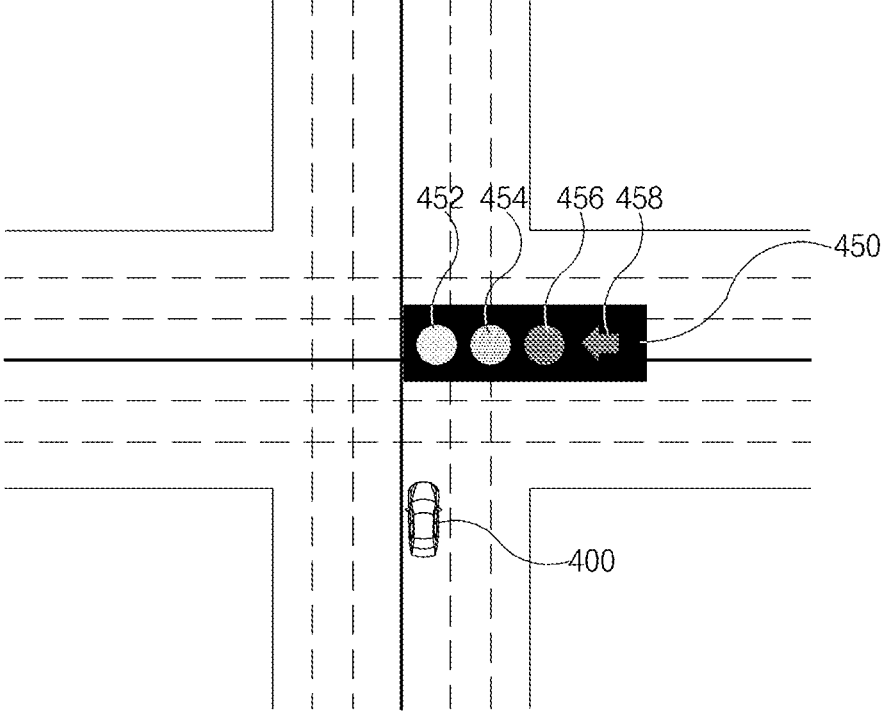
FIG. 4 is an operational conceptual diagram of a vehicle control apparatus according to an exemplary embodiment of the present disclosure.

FIG. 4 is an operational conceptual diagram of a vehicle control apparatus according to an exemplary embodiment of the present disclosure.

According to an exemplary embodiment of the present disclosure, a vehicle control apparatus (e.g., a vehicle control apparatus 100 of FIG. 1) may be configured for controlling various operations of a vehicle 400. For example, the vehicle control apparatus may be configured to determine whether to provide a service prohibited for use while the vehicle 400 is traveling among services to be provided to a user, based on information related to the vehicle 400 and/or information related to a traffic light 450 associated with driving of the vehicle 400.

According to an exemplary embodiment of the present disclosure, the vehicle control apparatus may be configured to determine whether to provide a service prohibited for use while the vehicle 400 is traveling, depending on a remaining time until a signal for allowing the vehicle 400 to drive is turned on, which is determined based on at least one of position information of the vehicle 400, driving information of the vehicle 400, traffic light information, or a combination thereof.

As an exemplary embodiment of the present disclosure, the traffic light information may include at least one of a traffic light identifier for each of the at least one traffic light 452, 454, 456, and 458, a traffic light position for each of the at least one traffic light 452, 454, 456, and 458, a traffic light control direction for each of the at least one traffic light 452, 454, 456, and 458, a lighting color type for each of the at least one traffic light 452, 454, 456, and 458, a lighting method for each of the at least one traffic light 452, 454, 456, and 458, a lighting order for each of the at least one traffic light 452, 454, 456, and 458, a lighting time for each of the at least one traffic light 452, 454, 456, and 458, whether to operate a flasher, a flasher operation time, or a combination thereof.

For example, the vehicle control apparatus may be configured to determine a traffic light which turns on a signal for allowing the vehicle 400 to drive among the at least one traffic light 452, 454, 456, and 458, based on at least one of the position information of the vehicle 400, the driving route of the vehicle 400, the driving direction of the vehicle 400, the driving line of the vehicle 400, the traffic light information, or a combination thereof.

For example, the vehicle control apparatus may identify that the vehicle 400 waits for making a left turn depending on FIG. 4, based on at least one of the position information of the vehicle 400, the driving direction of the vehicle 400, the driving line of the vehicle 400, or a combination thereof. Thus, the vehicle control apparatus may be configured to determine turning on the red traffic light 452 and the left turn traffic light 458 as turning on the signal for allowing the vehicle 400 to drive and may be configured to determine the traffic lights which turn on the signal for allowing the vehicle 400 to drive as the read traffic light 452 and the left turn traffic light 458.

According to an exemplary embodiment of the present disclosure, the vehicle control apparatus may be configured to determine a state where driving of the vehicle 400 is allowed (e.g., a state where the red traffic light 452 and the left turn traffic light 458 are turned on), may compare a remaining time until the traffic light 450 is turned on at the state where the driving of the vehicle 400 is allowed with a predetermined reference time, and may selectively perform a driving regulation ON operation or a driving regulation OFF operation.

For example, when the remaining time is less than or equal to the predetermined reference time, the vehicle control apparatus may prohibit the service from being provided.

As an exemplary embodiment of the present disclosure, the reference time may be set based on at least one of whether there are other vehicles which are present between the vehicle 400 and the traffic light which turns on the signal for allowing the vehicle 400 to drive (e.g., the red traffic light 452 and the left turn traffic light 458 when the vehicle 400 waits for making a left turn), the number of the other vehicles, traffic volume associated with driving of the vehicle 400, or a combination thereof, or may be directly set by a user of the vehicle 400.

As an exemplary embodiment of the present disclosure, a reference time in which there are no other vehicles may be set to a value greater than a reference time in which there are the other vehicles.

As an exemplary embodiment of the present disclosure, the reference time may include a negative correlation with the number of the other vehicles. In other words, as the number of the other vehicles increases, the reference time may be set to a smaller value.

As an exemplary embodiment of the present disclosure, the reference time may include a positive correlation with a degree to which traffic volume increases. In other words, as the traffic volume increases, the reference time may be set to a larger value.

As an exemplary embodiment of the present disclosure, the reference time may be a setting value capable of being directly set by the user of the vehicle 400.

Figure 5:
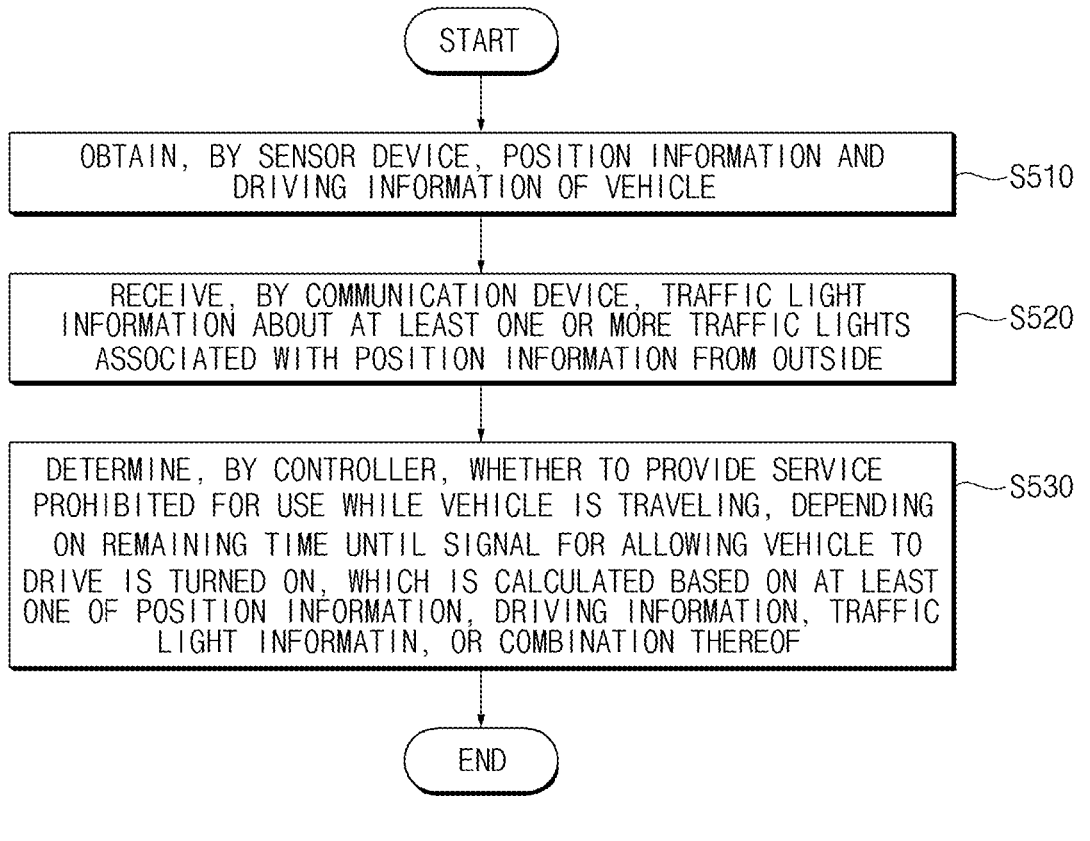
FIG. 5 is an operational flowchart of a vehicle control apparatus according to an exemplary embodiment of the present disclosure.

FIG. 5 is an operational flowchart illustrating a vehicle control method according to an exemplary embodiment of the present disclosure.

According to an exemplary embodiment of the present disclosure, a vehicle control apparatus (e.g., a vehicle control apparatus 100 of FIG. 1) may perform operations included in FIG. 5. For example, at least some of components (e.g., a sensor device 110, a communication device 120, a controller 130, and/or a service providing device 140 of FIG. 1) included in the vehicle control apparatus may be configured to perform the operations of FIG. 5.

Operations in S510 to S530 in an exemplary embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an exemplary embodiment of the present disclosure, in S510, the vehicle control apparatus may obtain position information and driving information of a vehicle using a sensor device.

For example, the driving information may include at least one of a driving route of the vehicle, a driving direction of the vehicle, a driving line of the vehicle, or a combination thereof.

According to an exemplary embodiment of the present disclosure, in S520, the vehicle control apparatus may receive traffic light information related to at least one traffic light associated with the position information from the outside thereof using a communication device.

As an exemplary embodiment of the present disclosure, the traffic light information may include at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light whether to operate a flasher, a flasher operation time, or a combination thereof.

For example, the vehicle control apparatus may receive traffic light information related to at least one traffic light from a vehicle control server (e.g., a vehicle control server 202 of FIG. 2).

According to an exemplary embodiment of the present disclosure, in S530, the vehicle control apparatus may be configured to determine whether to provide a service prohibited for use while the vehicle is traveling, depending on a remaining time until a signal for allowing the vehicle to drive is turned on, which is determined based on at least one of the position information, the driving information, the traffic light information, or a combination thereof using a controller.

For example, the remaining time may be a time which is determined based on at least one of position information of the vehicle, driving information of the vehicle, traffic light information, or a combination thereof from the outside thereof (e.g., the vehicle control server 202 of FIG. 2) and is transmitted to the vehicle control apparatus.

As an exemplary embodiment of the present disclosure, the driving information may include at least one of a driving route of the vehicle, a driving direction of the vehicle, a driving line of the vehicle, or a combination thereof.

For example, the vehicle control apparatus may be configured to determine a traffic light which turns on a signal for allowing the vehicle to drive among the at least one traffic light, based on at least one of the position information, the driving route, the driving direction, the driving line, the traffic light information, or a combination thereof.

For example, when the remaining time is less than or equal to a predetermined reference time, the vehicle control apparatus may prohibit the service from being provided.

For example, when there is no another vehicle between the vehicle and the traffic light which turns on the signal for allowing the vehicle to drive and when traffic volume associated with driving of the vehicle is low according to a specific criterion, the vehicle control apparatus may adjust the reference time to a value less than a predetermined value.

For example, when the remaining time is less than or equal to the value less than the predetermined value, the vehicle control apparatus may prohibit the service from being provided.

For example, the vehicle control apparatus may set a reference time in which there are no other vehicles to a value greater than a reference time in which there are the other vehicles, may set the reference time to include a negative correlation with the number of the other vehicles, or may set the reference time to include a positive correlation with a degree to which traffic volume increases.

For example, when there is no another vehicle between the vehicle and the traffic light which turns on the signal for allowing the vehicle to drive and when traffic volume associated with driving of the vehicle is low according to a specific criterion, the vehicle control apparatus may adjust the reference time to the value less than the predetermined value. The specific criterion may include at least one of, for example, a criterion for a distance from the vehicle, a criterion for an area where the vehicle is located, a criterion for a road where the vehicle is traveling, or a combination thereof.

For example, when the remaining time is less than or equal to the value less than the predetermined value, the vehicle control apparatus may prohibit the service from being provided.

Figure 6:
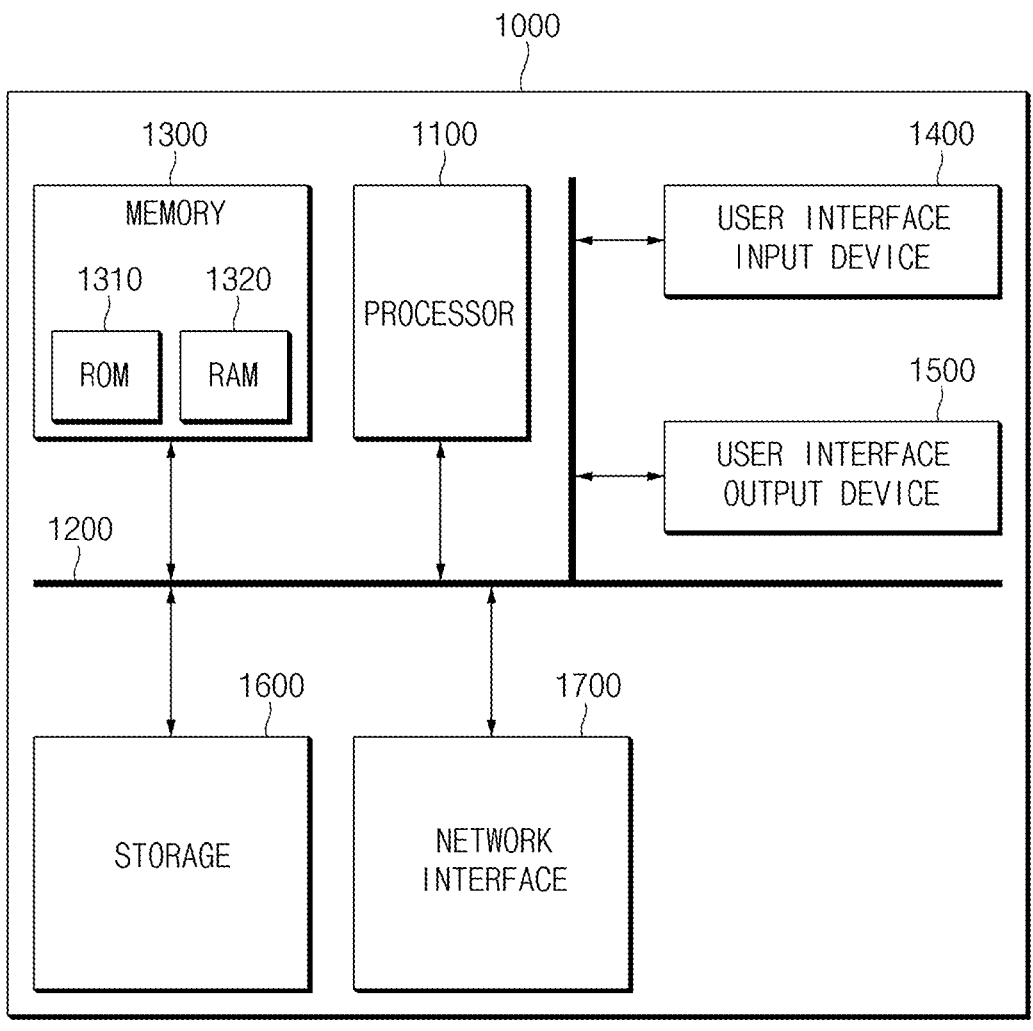
FIG. 6 illustrates a determining system about a vehicle control method according to an exemplary embodiment of the present disclosure.

FIG. 6 illustrates a computing system about a vehicle control method according to an exemplary embodiment of the present disclosure.

Referring to FIG. 6, a computing system 1000 about the vehicle control method may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be provided of effects of the vehicle control apparatus and the method thereof according to an exemplary embodiment of the present disclosure.

According to at least one of embodiments of the present disclosure, the vehicle control apparatus may more effectively and progressively perform driving regulation determination logic, thus preemptively determining whether to provide a service depending to performing the driving regulation determination logic at the same time as reinforcing the safety of at least one user who ride in the vehicle.

Furthermore, according to at least one of embodiments of the present disclosure, the vehicle control apparatus may more suitably and intuitively determine whether to provide a service to the user, based on at least one of position information of the vehicle, driving information of the vehicle, traffic light information, or a combination thereof.

Furthermore, according to at least one of embodiments of the present disclosure, the vehicle control apparatus may link whether to operate various components (e.g., a service providing device) provided in the vehicle to configure the various components using information (e.g., a remaining time) corresponding to a traffic light associated with the vehicle, rather than simply providing the corresponding information, thus providing the user with customer-oriented and stable vehicle experience with high marketability.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:
a sensor device configured to obtain position information and driving information of a vehicle;
a communication device configured to receive traffic light information related to at least one traffic light associated with the position information from outside thereof; and
a controller configured to determine whether to provide a service prohibited for use while the vehicle is traveling,
wherein whether to provide the service prohibited for use while the vehicle is traveling is determined depending on a remaining time until a signal for allowing the vehicle to drive is turned on, and
wherein the remaining time is determined based on at least one of the position information, the driving information, the traffic light information, or a combination thereof.

2. The vehicle control apparatus of claim 1,
wherein the driving information includes at least one of a driving route of the vehicle, a driving direction of the vehicle, a driving line of the vehicle, or a combination thereof, and
wherein the controller is further configured to determine a traffic light which turns on the signal for allowing the vehicle to drive among the at least one traffic light, based on at least one of the position information, the driving information, the driving direction, the driving line, the traffic light information, or a combination thereof.

3. The vehicle control apparatus of claim 1, wherein the traffic light information includes at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

4. The vehicle control apparatus of claim 1,
wherein the controller is further configured to prohibit the service from being provided, when the controller concludes that the remaining time is less than or equal to a predetermined reference time.

5. The vehicle control apparatus of claim 4, wherein the reference time is set based on at least one of whether there are other vehicles which are present between the vehicle and a traffic light which turns on the signal for allowing the vehicle to drive, a number of other vehicles, traffic volume associated with driving of the vehicle, or a combination thereof or is directly set in response to a user's input of the vehicle.

6. The vehicle control apparatus of claim 5, wherein a reference time in which there are no other vehicles is set to a value greater than a reference time in which there are the other vehicles.

7. The vehicle control apparatus of claim 5, wherein the reference time includes a negative correlation with the number of the other vehicles.

8. The vehicle control apparatus of claim 5, wherein the reference time includes a positive correlation with a degree to which the traffic volume increases.

9. The vehicle control apparatus of claim 4, wherein the controller is further configured to adjust the reference time to a value less than a predetermined value, when there is no another vehicle between the vehicle and a traffic light which turns on the signal for allowing the vehicle to drive and when a traffic volume associated with driving of the vehicle is lower than a predetermined amount according to a criterion, and to prohibit the service from being provided, when the remaining time is less than or equal to the value less than the predetermined value.

10. A vehicle control system, comprising:
a server including traffic light information related to at least one traffic light; and
a vehicle configured to deliver at least one of position information of the vehicle, driving information of the vehicle, or a combination thereof to the server, receive a remaining time until a signal for allowing the vehicle to drive is turned on from the server, and determine whether to provide a service prohibited for use while the vehicle is traveling, depending on the remaining time,
wherein the remaining time is determined based on at least one of the position information, the driving information, the traffic light information, or a combination thereof.

11. The vehicle control system of claim 10, wherein the server is configured to determine the remaining time based on at least one of the position information, the driving information, the traffic light information, or a combination thereof.

12. The vehicle control system of claim 10,
wherein the driving information includes at least one of a driving route of the vehicle, a driving direction of the vehicle, a driving line of the vehicle, or a combination thereof, and
wherein the server is configured to determine a traffic light which turns on the signal for allowing the vehicle to drive among the at least one traffic light, based on at least one of the position information, the driving route, the driving direction, the driving line, the traffic light information, or a combination thereof.

13. The vehicle control system of claim 10, wherein the traffic light information includes at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

14. The vehicle control system of claim 10, wherein the vehicle is configured to prohibit the service from being provided, when the reference time is less than or equal to a predetermined reference time.

15. The vehicle control system of claim 14, wherein the vehicle is configured to set the reference time based on at least one of whether there are other vehicles which are present between the vehicle and a traffic light which turns on the signal for allowing the vehicle to drive, a number of the other vehicles, traffic volume associated with driving of the vehicle, or a combination thereof or sets the reference time in response to an input of a user of the vehicle.

16. The vehicle control system of claim 15, wherein the vehicle is configured to set a reference time in which there are no other vehicles to a value greater than a reference time in which there are the other vehicles, to set the reference time to include a negative correlation with the number of the other vehicles, or to set the reference time to include a positive correlation with a degree to which the traffic volume increases.

17. The vehicle control system of claim 14, wherein the vehicle is configured to prohibit the reference time to a value less than a predetermined value, when there is no another vehicle between the vehicle and a traffic light which turns on the signal for allowing the vehicle to drive and when a traffic volume associated with driving of the vehicle is lower than a predetermined amount according to a criterion, and to prohibit the service from being provided, when the remaining time is less than or equal to the value less than the predetermined value.

18. A vehicle control method, comprising:
obtaining, by a sensor device, position information and driving information of a vehicle;
receiving, by a communication device, traffic light information related to at least one traffic light associated with the position information from outside thereof; and
determining, by a controller, whether to provide a service prohibited for use while the vehicle is traveling,
wherein whether to provide the service prohibited for use while the vehicle is traveling is determined depending on a remaining time until a signal for allowing the vehicle to drive is turned on, and
wherein the remaining time is determined based on at least one of the position information, the driving information, the traffic light information, or a combination thereof.

19. The vehicle control method of claim 18,
wherein the driving information includes at least one of a driving route of the vehicle, a driving direction of the vehicle, a driving line of the vehicle, or a combination thereof, and
wherein the method further includes:
determining, by the controller, a traffic light which turns on the signal for allowing the vehicle to drive among the at least one traffic light, based on at least one of the position information, the driving route, the driving direction, the driving line, the traffic light information, or a combination thereof.

20. The vehicle control method of claim 18, wherein the traffic light information includes at least one of a traffic light identifier for each of the at least one traffic light, a traffic light position for each of the at least one traffic light, a traffic light control direction for each of the at least one traffic light, a lighting color type for each of the at least one traffic light, a lighting method for each of the at least one traffic light, a lighting order for each of the at least one traffic light, a lighting time for each of the at least one traffic light, whether to operate a flasher, a flasher operation time, or a combination thereof.

* * * * *